Sept. 12, 1950  E. W. ADOLPHSON  2,522,204
WHEEL CLEANER
Filed June 21, 1949

INVENTOR.
E. W. ADOLPHSON
BY

ATTORNEY

Patented Sept. 12, 1950

2,522,204

UNITED STATES PATENT OFFICE 2,522,204

WHEEL CLEANER

Evert W. Adolphson, Des Moines, Iowa, assignor to Deere Manufacturing Co., Dubuque, Iowa, a corporation of Iowa Application June 21, 1949, Serial No. 100,372

9 Claims. (Cl. 280—158)

1

This invention relates to a wheel cleaner of the type used on wheels of agricultural machinery to keep the wheels free from mud and trash.

Many types of wheel cleaners have been known in the past and have consisted primarily of scrapers and the like adapted to scrape the rim or sides of the wheel as the wheel rotated. The cleaning of steel wheels presents problems quite different from those presented by the cleaning of wheels equipped with pneumatic tires, since in the former scrapers have little, if any, damaging effect on the wheels, whereas the usual steel-wheel scraper could not be satisfactorily used with a pneumatic tire. Again, a wheel equipped with a pneumatic tire is apt to collect considerably more mud and trash on its sides or faces. Attempts have been made to keep pneumatic-tired wheels free from mud and trash by means of scrapers in the form of blades, bars and the like, but experience has shown that mud and trash builds up to such an extent on such scrapers as to prevent rotation of the wheels.

According to the present invention, it is proposed to use a wheel scraper comprising at least one, and preferably two, means including wires arranged respectively at the inner and outer faces of the wheels, these wires being stretched along lines lying in chords of the wheel. A cleaner of this type is effective to slice mud and trash from the wheel as the wheel rotates. Such mud and trash cannot accumulate on the wire or wires. It is an important object of the invention to provide the wheel cleaner means as an attachment for a vehicle and to this end the wheel-cleaner means has attaching brackets arranged so as to dispose the wires in such manner as to effect the most efficient cleaning means.

The foregoing and other important objects and desirable features of the invention will become apparent to those versed in the art as the disclosure of a preferred embodiment of the invention is fully made in the following description and accompanying sheet of drawings in which Figure 1 is a fragmentary plan view of the frame structure and a wheel of a vehicle with the improved wheel cleaner mounted thereon;

The vehicle structure chosen for the purposes of illustration is merely representative of many types of structures with which the invention can

2 be utilized. Hence, the disclosure should be taken as illustrative and not limiting.

Figure 2:
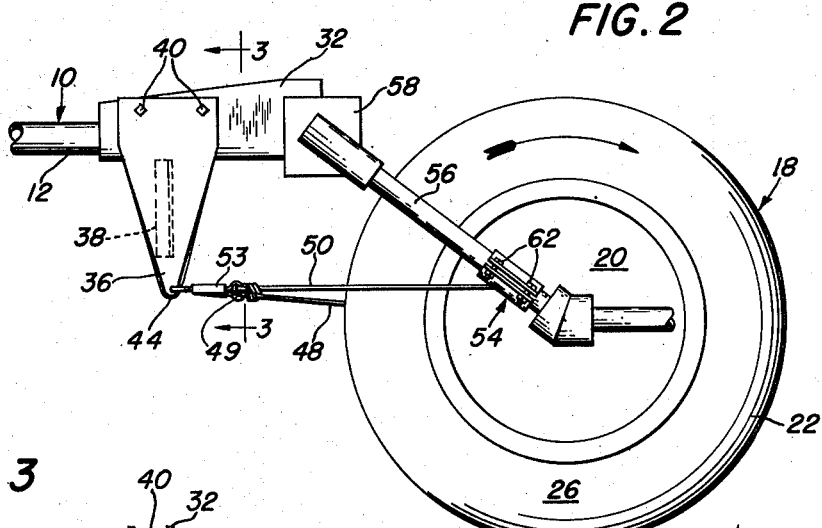
Figure 2 is a side view of the structure shown in Figure 1.

The vehicle structure shown here includes a main frame structure designated generally by the numeral 10. This structure has a longitudinal or fore and aft extending frame member 12 which includes an extension portion or member 14 bent to provide an axle or spindle 16 for a wheel 18. The wheel comprises a wheel body 20 and a pneumatic tire 22. The wheel is rotatable about the axis at 16 to carry the frame structure 10 for travel over the ground normally in the direction of the arrow in Figure 2.

The structure illustrated has the wheel 18 at one side thereof so that the inner face or side of the wheel 18 is approximate to the frame structure 10, this face of the wheel being designated by the numeral 24. The opposite or outer face of the wheel is designated by the numeral 26.

The frame structure 10 includes a tubular member 28 which is disposed transverse to the direction of travel of the vehicle and which extends outwardly or past the outer face 26 of the wheel 18. In the particular instance illustrated, the member 28 comprises part of the frame structure and is peculiar thereto. It will be appreciated, however, that the invention may be just as readily adapted to frame structures of other types, as will be apparent from the description to follow.

The wheel cleaner structure comprises support or bracket means designated generally by the numeral 30. This means has a U-shaped clamping portion 32 which is attached to or mounted on the frame member 12. The means further includes a pair of plates 34 and 36 which are rigidly interconnected by a web 38 (Figure 3) and which are further secured to the U-shaped member 32 by means of a pair of bolts 40.

Figure 1:
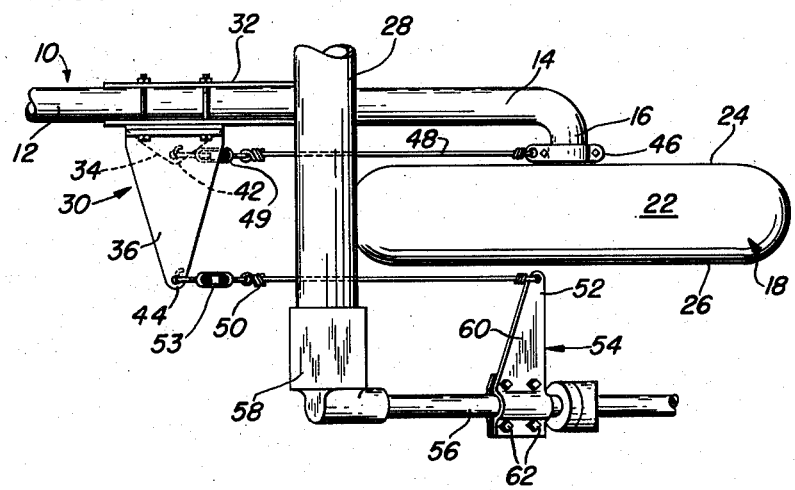
Figure 3:
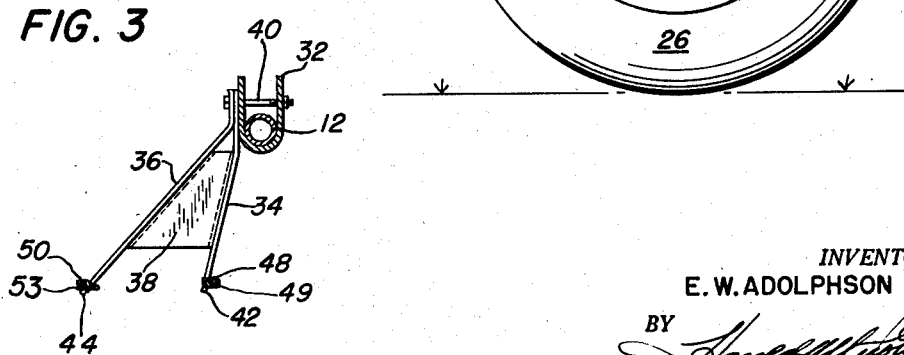
Figure 3 is a transverse sectional view taken substantially on the line 3—3 of Figure 2.
Figure 3:
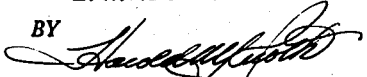

As best shown in Figure 3, the plates 34 and 36 diverge downwardly and respectively have connecting portions 42 and 44. These portions are spaced apart transversely as respects the line of travel of the vehicle. It will be appreciated that these portions may be otherwise suitably provided on support or bracket means peculiar to a particular vehicle structure. It will be apparent from Figure 1 that the portions 42 and 44 lie respectively in longitudinal planes closely adjacent the inner and outer faces 24 and 26 of the wheel 18. These portions are further radially beyond the outside diameter of the tire 22. In the instance shown, these portions are behind the wheel.

The spindle or axle 16 is provided with a connecting element in the form of a collar or clamp 46 which is substantially in fore and aft alinement with the connecting portion 42 on the bracket or support means 30. The wheel cleaner has means including a wire or the like, designated by the numeral 48, extending or stretched between the connecting portion 42 and the connecting element or collar 46. This wire lies along or closely adjacent the inner face 24 of the wheel and also lies substantially along a chord of the circle of the wheel. The wire 48 is preferably about one-quarter inch in diameter; although, this dimension will vary according to the conditions under which the vehicle operates. A turnbuckle 49, or equivalent tensioning device, is connected between the wire and the bracket portion 42.

A similar wire 50 is stretched between the connecting portion 44 and a second connecting element 52 comprising part of support or bracket means designated generally by the numeral 54. A turnbuckle 53 preferably makes the connection between the wire 50 and the bracket portion 44. In the particular instance illustrated, the bracket means 54 includes a longitudinally extending member 56 which is joined at its rear or upper end to the transverse member 28 by means of any suitable connection, such as a cap 58. To the member 56 is attached a bracket 60 which is apertured to receive the forward end of the wire 50. This bracket includes clamping means, including bolts 62, for attachment to the member 56. As mentioned above, mounting of the wires 48 and 50, as illustrated, is peculiar to the type of vehicle structure illustrated and it will be appreciated that similar attaching means for other vehicles may readily be worked out by those versed in the art on the basis of the present disclosure. For example, in the present illustration, the member 56 may comprise part of the vehicle structure 10.

The arrangement of the connecting element 52 is such that it is substantially coaxial with the connecting element 46; although, this is not critical as long as the wire 50 lies in the plane illustrated and extends substantially along a chord of the wheel, just as the wire 48 does.

It will be seen that any mud or trash picked up by the wheel 18 as it rotates will be sliced from opposite sides of the wheel by the wires 48 and 50. Because of the minimum cross section of each wire, the mud or trash will not accumulate on the wires as it does on wheel cleaners of the type heretofore known. The spacing of the wires from the faces of the wheel may be varied according to conditions encountered. The spacing illustrated is such as to prevent the wires from rubbing on or otherwise damaging the pneumatic tire 22. Since the normal operation of the vehicle is in the direction of the arrow shown in Figure 2, the wires are placed at the rear of the wheel axis. Hence, the cleaner is in the position in which it will be most effective for the expected operation of the vehicle and will operate to slice the mud and trash from the wheel before this mud and trash accumulates to such an extent as to pack between the wheel and any of the frame members of the vehicle structure. Tension on the wires may be varied to suit conditions. For example, more tension may be needed in extreme trash or freezing mud.

Other features and objects of the invention, not specifically enumerated above, will undoubtedly occur to those versed in the art, as will numerous modifications and alterations in the preferred embodiment of the invention illustrated, all of which may be achieved without departing from the spirit and scope of the invention as defined in the appended claims.

What is claimed is:

1. For a vehicle including a ground wheel rotatable to carry the vehicle forwardly over the ground, a wheel cleaner comprising: first support means having provision for attachment to the vehicle and further including a pair of portions positionable to the rear of the wheel and radially beyond the diameter thereof, said portions being spaced apart transverse to the line of travel of the vehicle to lie respectively closely inside and outside the inner and outer faces of the wheel; second support means including a pair of elements spaced apart transversely on the order of the spacing of said portions and having provision for attachment to the vehicle for disposition ahead of said portions; and a pair of wires respectively connected at opposite ends to the elements and to said portions to lie respectively closely alongside the inner and outer faces of the wheel for slicing mud and the like from the sides of the wheel.

2. For a vehicle including a ground wheel rotatable to carry the vehicle, a wheel cleaner comprising: first support means having provision for attachment to the vehicle and further including a pair of portions positionable radially beyond the diameter of the wheel, said portions being spaced apart transverse to the plane of the wheel to lie respectively closely inside and outside the inner and outer faces of the wheel; second support means including a pair of elements spaced apart transversely on the order of the spacing of said portions and having provision for attachment to the vehicle for disposition within the diameter of the wheel; and a pair of wires respectively connected at opposite ends to the elements and to said portions to lie respectively closely alongside the inner and outer faces of the wheel for slicing mud and the like from the sides of the wheel.

3. For a vehicle including a wheel rotatable to carry the vehicle forwardly over the ground, a wheel cleaner comprising: a pair of support means having provision for attachment to the vehicle and positionable in fore and aft spaced apart relation closely adjacent one face of the wheel and on a line lying along a chord of the wheel, one of said support means being further positionable radially beyond the outside diameter of the wheel, and means including a wire or the like extending between said pair of support means closely adjacent said face of the wheel for slicing mud and the like from said face of the wheel.

4. For a vehicle having a frame structure carried on a wheel for forward travel over the ground and including an axle for the wheel, a wheel cleaner comprising: a bracket having means for attachment to the frame structure and including a connecting portion radially beyond the diameter of the wheel and generally in radial alinement with the axle, said portion being positionable in a fore and aft plane closely adjacent one face of the wheel; a connecting element having provision for attachment to the axle generally in said plane; and a wire or the like extending between said portion and said element to lie closely adjacent said one side of the wheel for slicing mud and the like from the wheel.

5. The invention defined in claim 4, further characterized in that: the bracket includes an extension transverse to the line of travel of the vehicle and providing a second connecting portion positionable in a second fore and aft plane closely adjacent the other face of the wheel; and a supporting arm is provided having means for attachment to the frame structure and including a second connecting element positionable generally in axial alinement with the first connecting element and generally in said second plane; and a second wire or the like extending between said second connecting portion and said second connecting element to lie closely along said other face of the wheel.

6. For a vehicle including a wheel rotatable to carry the vehicle forwardly over the ground, a wheel cleaner comprising: a pair of support means having provision for attachment to the vehicle and positionable in fore and aft spaced apart relation closely adjacent one face of the wheel with one support means generally at the axis of the wheel and the other radially beyond the outside diameter of the wheel; and means including a wire or the like extending between said pair of support means closely adjacent said face of the wheel for slicing mud and the like from said face of the wheel.

7. The invention defined in claim 6, further characterized in that: a second pair of support means is positionable at the other face of the wheel generally in accordance with the positioning of the first pair; and second means including a wire or the like extending between the support means of said second pair for slicing mud and the like from said other face of the wheel.

8. For a vehicle including a wheel rotatable to carry the vehicle forwardly over the ground, a wheel cleaner comprising: a pair of support means having provision for attachment to the vehicle and positionable in fore and aft spaced apart relation closely adjacent one face of the wheel and on a line lying along a chord of the wheel; and means including a wire or the like extending between said pair of support means closely adjacent said face of the wheel for slicing mud and the like from said face of the wheel.

9. The invention defined in claim 8, further characterized in that: tensioning means is provided for adjusting the tension in the wire.

EVERT W. ADOLPHSON.

REFERENCES CITED

The following references are of record in the file of this patent:

UNITED STATES PATENTS

| Number | Name | Date |
|---|---|---|
| 979,699 | Prince | Dec. 27, 1910 |
| 2,157,253 | Yetter | May 9, 1939 |

FOREIGN PATENTS

| Number | Country | Date |
|---|---|---|
| 316 | Germany | Oct. 10, 1899 |
| 279,652 | Great Britain | Nov. 3, 1927 |